United States Patent
Lu et al.

(10) Patent No.: US 10,504,641 B2
(45) Date of Patent: Dec. 10, 2019

(54) MAGNETIC ASSEMBLY AND POWER SUPPLY SYSTEM WITH SAME

(71) Applicant: Delta Electronics (Shanghai) Co., Ltd., Shanghai (CN)

(72) Inventors: Zengyi Lu, Shanghai (CN); Yajiang Yan, Shanghai (CN); Haijun Yang, Shanghai (CN); Jun Sun, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 568 days.

(21) Appl. No.: 14/970,174

(22) Filed: Dec. 15, 2015

(65) Prior Publication Data
US 2017/0011830 A1    Jan. 12, 2017

(30) Foreign Application Priority Data
Jul. 9, 2015   (CN) .................... 2015 2 0495224 U (51) Int. Cl.
| | | |
|---|---|---|
| H01F 27/00 | (2006.01) | |
| H01F 3/10 | (2006.01) | |
| H01F 37/00 | (2006.01) | |
| H02M 3/158 | (2006.01) | |

(52) U.S. Cl.
CPC ............... *H01F 3/10* (2013.01); *H01F 27/00* (2013.01); *H01F 37/00* (2013.01); *H02M 3/1584* (2013.01)

(58) Field of Classification Search
CPC .................................................. H01F 27/00–36
USPC ..... 336/65, 83, 170–173, 212–215, 233–234
See application file for complete search history.

(56) References Cited

U.S. PATENT DOCUMENTS

| | | | | |
|---|---|---|---|---|
| 4,206,434 | A * | 6/1980 | Hase .................... | H01F 21/08 174/DIG. 17 |
| 5,182,535 | A * | 1/1993 | Dhyanchand ......... | H01F 30/12 336/12 |
| 6,657,529 | B1 * | 12/2003 | Albach ................. | H01F 27/346 336/147 |
| 7,142,081 | B1 * | 11/2006 | Shudarek .............. | H01F 27/24 336/178 |
| 7,598,839 | B1 * | 10/2009 | Wedley ................. | H01F 3/12 336/131 |
| 8,120,457 | B2 * | 2/2012 | Hu ........................ | H01F 29/14 336/178 |
| 9,424,979 | B2 * | 8/2016 | Lin ....................... | H01F 3/14 |

(Continued)

*Primary Examiner* — Tuyen T Nguyen
(74) *Attorney, Agent, or Firm* — Kirton McConkie; Evan R. Witt (57) ABSTRACT

A magnetic assembly includes plural first magnetic cores, plural coil windings and a second magnetic core. Each of the plural first magnetic cores includes plural legs and a first connection part. The first connection part is connected with first terminals of the plural legs. The first connection part of the first magnetic core at an upper position is located adjacent to second terminals of the plural legs of the adjacent first magnetic core at a lower position. Each coil winding is wound around at least one leg of the plural legs of the corresponding first magnetic core so as to form a magnetic element of the corresponding converter. The second magnetic core is stacked over the plural first magnetic cores. The second magnetic core is located adjacent to the second terminals of the legs of the topmost first magnetic core.

14 Claims, 9 Drawing Sheets

(56) References Cited

U.S. PATENT DOCUMENTS

2006/0290458 A1* 12/2006 Sano .................. H01F 3/12
                                                  336/212
2008/0205098 A1*  8/2008 Xu .................... H02M 3/1584
                                                  363/45

* cited by examiner

MAGNETIC ASSEMBLY AND POWER SUPPLY SYSTEM WITH SAME

FIELD OF THE INVENTION

The present invention relates to a magnetic assembly, and more particularly to a magnetic assembly with reduced magnetic loss, volume, weight and cost. The present invention also relates to a power supply system with the magnetic assembly.

BACKGROUND OF THE INVENTION

Generally, plural converters are connected with each other in parallel in a power supply system when high power is required. Each converter comprises at least one magnetic element such as a transformer or an inductor. The magnetic element comprises a magnetic core and a coil winding. The coil winding is wound around the magnetic core to form a closed magnetic flux path. Consequently, the magnetic element is produced.

Since the magnetic element occupies large fractions of volume and weight of the overall power supply system, it is an important issue to reduce the volume and weight of the magnetic element in order to increase the power density of the power supply system. However, since the magnetic elements of the plural converters have individual magnetic cores and the magnetic flux paths are independent, the volume and weight of the overall power supply system are increased and the fabricating cost of the power supply system is high. Moreover, during operations of the power supply system, the magnetic core of the magnetic element of each converter will result in a large magnetic loss. Since the magnetic cores of the magnetic elements of the plural converters in the conventional power supply system are independent and the magnetic flux paths are independent, the conventional power supply system has large magnetic loss and volume.

Therefore, there is a need of providing a magnetic assembly and a power supply system with the magnetic assembly in order to overcome the above drawbacks.

SUMMARY OF THE INVENTION

An object of the present invention provides a magnetic assembly and a power supply system with the magnetic assembly. The magnetic assembly integrates plural magnetic elements. Consequently, the volume and weight of the magnetic assembly have been reduced, and the power supply system has reduced cost and increased power density.

In accordance with an aspect of the present invention, there is provided a magnetic assembly for plural parallel-connected converters. The magnetic assembly includes plural first magnetic cores, plural coil windings and a second magnetic core. The plural first magnetic cores are stacked over each other from bottom to top. Each of the plural first magnetic cores includes plural legs and a first connection part. The first connection part is connected with first terminals of the plural legs. The first connection part of the first magnetic core at an upper position is located adjacent to second terminals of the plural legs of the adjacent first magnetic core at a lower position. Each coil winding is wound around at least one leg of the plural legs of the corresponding first magnetic core so as to form a magnetic element of the corresponding converter. The second magnetic core is stacked over the plural first magnetic cores. The second magnetic core is located adjacent to the second terminals of the legs of the topmost first magnetic core.

In accordance with another aspect of the present invention, there is provided a power supply system. The power supply system includes plural converters. The plural converters are connected with each other in parallel. The plural converters receive an input voltage and convert the input voltage into an output voltage. The plural converters include at least one magnetic assembly. The magnetic assembly includes plural first magnetic cores, plural coil windings and a second magnetic core. The plural first magnetic cores are stacked over each other from bottom to top. Each of the plural first magnetic cores includes plural legs and a first connection part. The first connection part is connected with first terminals of the plural legs. The first connection part of the first magnetic core at an upper position is located adjacent to second terminals of the plural legs of the adjacent first magnetic core at a lower position. Each coil winding is wound around at least one leg of the plural legs of the corresponding first magnetic core so as to form a magnetic element of the corresponding converter. The second magnetic core is stacked over the plural first magnetic cores. The second magnetic core is located adjacent to the second terminals of the legs of the topmost first magnetic core.

From the above descriptions, the present invention provides a magnetic assembly and a power supply system with the magnetic assembly. The magnetic assembly comprises plural magnetic elements of plural converters. Moreover, portions of the magnetic core of the magnetic elements and magnetic flux paths are shared. Consequently, the volume and weight of the magnetic assembly of the power supply system have been reduced. Under this circumstance, the fabricating cost of the magnetic elements is reduced, and the power density of the power supply system is increased.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In this context, the term "equal" indicates a certain tolerance. For example, the tolerance is 20%, preferably 10%, and more preferably 5%.

In this context, each of the first coil winding and the second coil winding is composed of one coil winding or plural coil windings according to the practical requirements.

Moreover, the plural converters are connected with each other in parallels. In particular, the input terminals and/or the output terminals of the converters are connected with each other in parallel.

Figure 1:
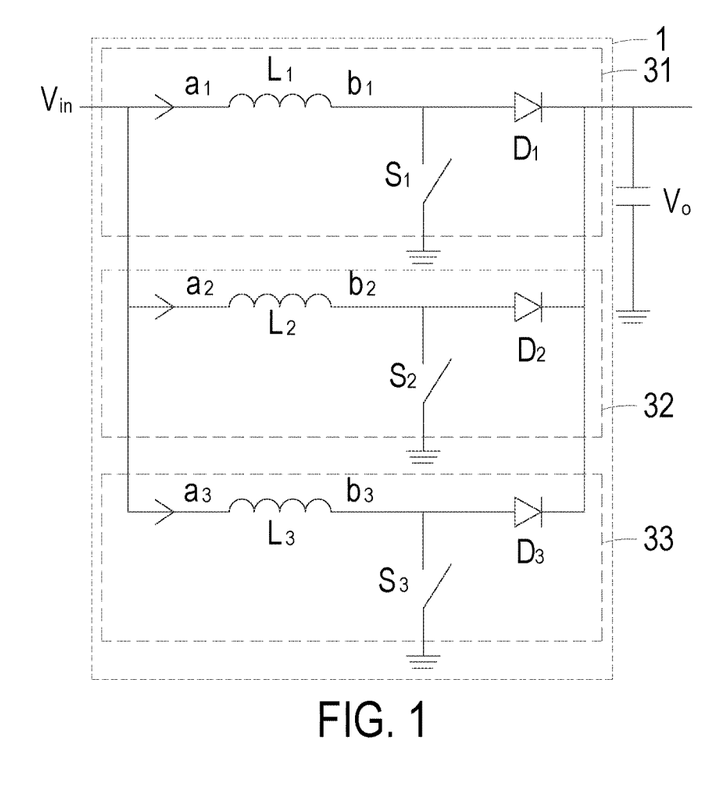
FIG. 1 is a schematic circuit diagram illustrating a power supply system according to a first embodiment of the present invention.
Figure 2:
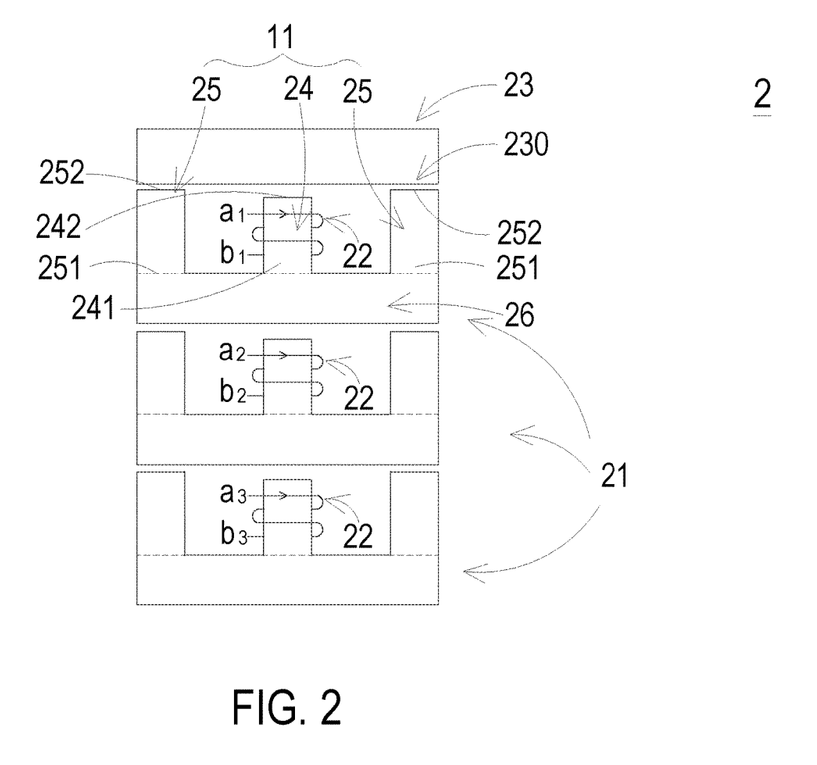
FIG. 2 schematically illustrates an exemplary magnetic assembly used in the power supply system of FIG. 1.

FIG. 1 is a schematic circuit diagram illustrating a power supply system according to a first embodiment of the present invention. FIG. 2 schematically illustrates a magnetic assembly used in the power supply system of FIG. 1. As shown in FIGS. 1 and 2, the power supply system 1 comprises plural converters, which are connected with each other in parallel. Preferably but not exclusively, plural converters comprises a first converter 31, a second converter 32 and a third converter 33. These converters 31, 32 and 33 receive an input voltage $V_{in}$ and converting the input voltage $V_{in}$ into an output voltage $V_o$. Preferably but not exclusively, the converters 31, 32 and 33 are boost converters.

In this embodiment, the first converter 31 comprises a first magnetic element, a first switch element $S_1$ and a first diode $D_1$. The first magnetic element corresponds to the inductor or the transformer of the first converter 31. For example, in case that the first converter 31 is a boost converter, the first magnetic element is a first inductor $L_1$. A first terminal $a_1$ of the first inductor $L_1$ is electrically connected with an input terminal of the power supply system 1 for receiving the input voltage $V_{in}$ and storing or releasing the received electric energy. A second terminal $b_1$ of the first inductor $L_1$ is electrically connected with a first terminal of the first switch element $S_1$. A second terminal of the first switch element $S_1$ is electrically connected with a ground terminal. An anode of the first diode $D_1$ is electrically connected with the second terminal $b_1$ of the first inductor $L_1$ and the first terminal of the first switch element $S_1$. A cathode of the first diode $D_1$ is electrically connected with an output terminal of the power supply system 1.

The circuitry configurations of the second converter 32 and the third converter 33 are similar to the circuitry configuration of the first converter 31. The second converter 32 comprises a second inductor $L_2$, a second switch element $S_2$ and a second diode $D_2$. The third converter 33 comprises a third inductor $L_3$, a third switch element $S_2$ and a third diode $D_3$. The functions and relationships of the second inductor $L_2$, the second switch element $S_2$ and the second diode $D_2$ and the functions and relationships of the third inductor $L_3$, the third switch element $S_3$ and the third diode $D_3$ are similar to those of the first inductor $L_1$, the first switch element $S_1$ and the first diode $D_1$, and are not redundantly described herein. It is noted that the number of the converters in the power supply system 1 is not restricted to three. That is, the number of the converters in the power supply system 1 may be varied according to the practical requirements.

FIG. 2 schematically illustrates an exemplary magnetic assembly used in the power supply system of FIG. 1. In this embodiment, an integrated magnetic assembly 2 (also referred hereinafter as a magnetic assembly) comprises the first inductor $L_1$, the second inductor $L_2$ and the third inductor $L_3$. The magnetic assembly 2 comprises plural first magnetic cores 21, plural coil windings 22 and a second magnetic core 23. In this embodiment, the magnetic assembly 2 comprises three first magnetic cores 21, three coil windings 22 and a second magnetic core 23. Each first magnetic core 21 comprises plural legs 11 and a first connection part 26. The first terminals of the plural legs 11 are connected with the first connection part 26.

Please refer to FIG. 2 again. The plural first magnetic cores 21 are stacked over each other from bottom to top. Consequently, the first connection part 26 of the upper first magnetic core 21 is located adjacent to the second terminals of the plural legs 11 of the adjacent lower first magnetic core 21. Moreover, each coil winding 22 is wound around one leg 11 of the corresponding first magnetic core 21. Consequently, the plural first coil windings 22 are formed as the coil windings of the inductors $L_1$, $L_2$ and $L_3$ of the converters 31, 32 and 33, respectively. In this embodiment, the first terminals $a_1$, $a_2$ and $a_3$ of the three first coil windings 22 correspond to the first terminal $a_1$ of the first inductor $L_1$, the first terminal $a_2$ of the second inductor $L_2$ and the first terminal $a_3$ of the third inductor $L_3$, respectively. Moreover, the second terminals $b_1$, $b_2$ and $b_3$ of the three first coil windings 22 correspond to the second terminal $b_1$ of the first inductor $L_1$, the second terminal $b_2$ of the second inductor $L_2$ and the second terminal $b_3$ of the third inductor $L_3$, respectively. In some embodiment, each first coil winding 22 is composed of plural coil windings, and the plural coil windings are collaboratively wound around one leg 11 of the corresponding first magnetic core 21. Consequently, the plural first coil windings 22 are formed as the coil windings of the inductors $L_1$, $L_2$ and $L_3$ of the converters 31, 32 and 33, respectively. The second magnetic core 23 is stacked over the plural first magnetic cores 21. Consequently, a first side 230 of the second magnetic core 23 is located adjacent to the second terminals of the legs 11 of the topmost first magnetic core 21.

In the embodiment of FIG. 2, the plural legs 11 of each first magnetic core 21 comprise a first central leg 24 and two first side legs 25. The two first side legs 25 are opposed to each other with relative to the first central leg 24. Moreover, the distance between one first side leg 25 and the first central leg 24 is equal to the distance between the other first side leg 25 and the first central leg 24. In each first magnetic core 21, the first connection part 26 is connected with the first terminal 241 of the first central leg 24 and the first terminals 251 of the two first side legs 25. Moreover, the plural first magnetic cores 21 are stacked over each other from bottom to top. Consequently, the first connection part 26 of the upper first magnetic core 21 is located adjacent to the second terminal 242 of the first central leg 24 and the second terminals 252 of the two first side legs 25 of the adjacent lower first magnetic core 21. For supporting the upper first magnetic core 21, the spaces between the second terminal 242 of the first central leg 24 and the second terminals 252 of the two first side legs 25 of the lower first magnetic core 21 and the first connection part 26 of the upper first magnetic core 21 may be filled with an insulation material. In this embodiment, each first coil winding 22 is wound around the first central leg 24 of the corresponding first magnetic core 21. Moreover, the first side 230 of the second magnetic core 23 is located adjacent to the second terminal 242 of the first central leg 24 and the second terminals 252 of the two first side legs 25 of the topmost first magnetic core 21.

In this embodiment, the first central leg 24, the two first side legs 25 and the first connection part 26 of each first magnetic core 21 are collaboratively formed as an E-shaped core, and the second magnetic core 23 is an I-shaped core. It is noted that the number of the first magnetic cores 21 and the number of the first coil windings 22 may be varied according to the practical requirements.

Figure 3:
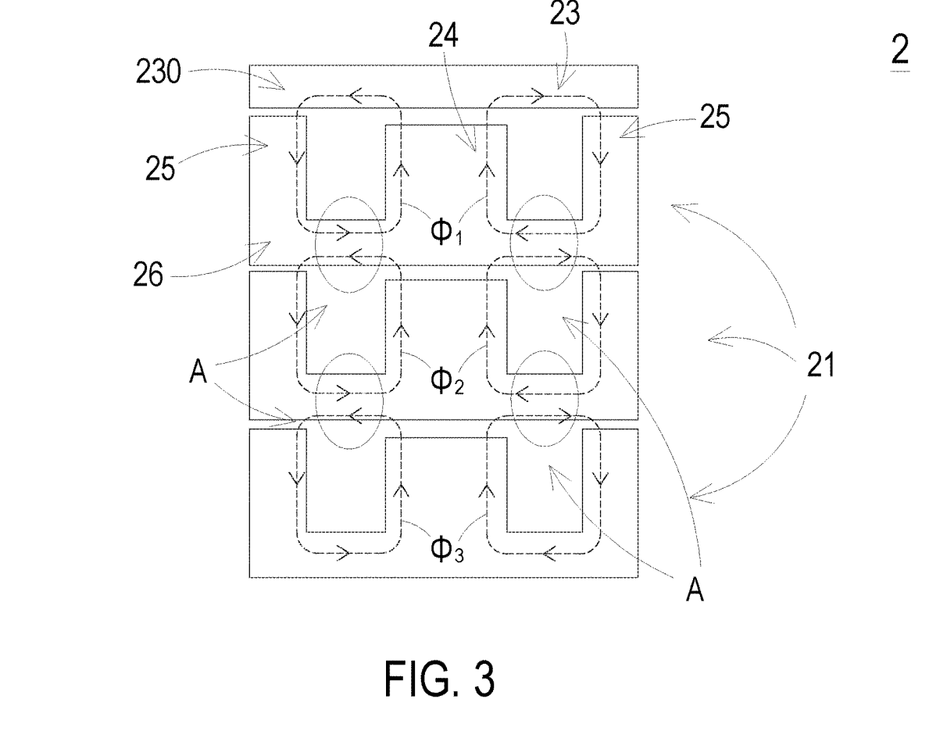
FIG. 3 schematically illustrates the flows of the magnetic fluxes in the magnetic assembly of FIG. 2.

FIG. 3 schematically illustrates the flows of the magnetic fluxes in the magnetic assembly of FIG. 2. During operations of the power supply system 1, the converters 31, 32 and 33 receive the input voltage $V_{in}$. Consequently, electric currents flow through the first coil windings 22 wounding around the first central legs 24 of the three first magnetic cores 21 of the magnetic assembly 2, and magnetic fluxes $\Phi_1$, $\Phi_2$ and $\Phi_3$ are generated thereof, respectively. Since the electric currents flowing through the first coil windings 22 are in the same direction, the magnetic fluxes $\Phi_1$, $\Phi_2$ and $\Phi_3$ flow in the directions indicated by the dotted lines. In particular, the magnetic fluxes $\Phi_1$, $\Phi_2$ and $\Phi_3$ flowing through the first central legs 24 of the three first magnetic cores 21 are in the same direction (i.e., in the upward direction). Moreover, each of the magnetic fluxes $\Phi_2$ and $\Phi_3$ flows through the bilateral sides of the first connection part 26 of the upper first magnetic core 21, the two first side legs 25 of the corresponding first magnetic core 21 and then the first connection part 26 of the corresponding first magnetic core 21 and returns to the first central leg 24. The magnetic flux $\Phi_1$ flows through the bilateral sides of the second magnetic cores 23, the two first side legs 25 of the corresponding first magnetic core 21 and then the first connection part 26 of the corresponding first magnetic core 21 and returns to the first central leg 24. As mentioned above, the electric currents flow through the first coil windings 22 of the three first magnetic cores 21 of the converters 31, 32 and 33 in the same direction. Consequently, in every two adjacent first magnetic cores 21, the magnetic fluxes through the first connection part 26 of the upper first magnetic core 21 are in opposite directions. As shown in FIG. 3, plural zones A are formed in the first connection part 26 of the upper first magnetic core 21. The magnetic fluxes in the zones A of the shared first connection part 26 are canceled by each other. That is, portions of the magnetic fluxes of every two adjacent first magnetic cores 21 can be canceled by each other. Consequently, the peak flux density is reduced. Under this circumstance, the cross section area of the first connection part 26 can be reduced.

More especially, if the electric currents flow through the first coil windings 22 wounding around the first central legs 24 of the three first magnetic cores 21 of the converters 31, 32 and 33 are equal to each other, the magnetic fluxes through the first connection part 26 of the upper first magnetic core 21 can be completely canceled. Under this circumstance, the peak flux density is further reduced, and the cross section area of the first connection part 26 is further reduced.

In one embodiment, adjusts the inductance values of the inductors $L_1$, $L_2$ and $L_3$ to be equal, to make the electric currents flowing through the first coil windings 22 wounding around the three first magnetic cores 21 of the converters 31, 32 and 33 to be equal. In one embodiment, adjusts the turns of the first coil windings 22 to be equal, to make the inductance values of the inductors $L_1$, $L_2$ and $L_3$ to be equal. In one embodiment, the lengths of the two side legs 25 of each first magnetic core 21 are equal. So the assembling process is simplified, and the magnetic fluxes are distributed more uniformly to forbid partial saturation. More preferably, the lengths of the two side legs 25 of each first magnetic core 21 are equal, and the first central leg 24 of each first magnetic core 21 has the same length. That is, each first magnetic core 21 is symmetrical. Consequently, the assembling process is simplified, and to make the inductance values of the inductors $L_1$, $L_2$ and $L_3$ to be equal.

From the above descriptions, the plural inductors $L_1$, $L_2$ and $L_3$ of the plural converters 31, 32 and 33 are formed by the magnetic assembly 2, and portions of the magnetic flux paths of the first magnetic cores 21 of the magnetic assembly 2 are shared. That is, portions of the first connection parts 26 of the first magnetic cores 21 are shared. In comparison with the magnetic elements of the converters of the conventional power supply system having the independent magnetic cores and coil windings, the power supply system 1 of the present invention can largely reduce the volumes and weights of the magnetic elements. Moreover, since portions of the magnetic flux paths of the first magnetic cores 21 and the second magnetic core 23 of the magnetic assembly 2 are shared to cancel the magnetic fluxes, the peak flux density is reduced. Under this circumstance, the volume and weight of the magnetic element are further reduced, and the inductance values of the inductors $L_1$, $L_2$ and $L_3$ are equal. Consequently, the plural parallel-connected converters 31, 32 and 33 can be controlled more easily.

Moreover, since the plural converters 31, 32 and 33 of the power supply system 1 are connected with each other in parallel and the circuitry configurations of the plural converters 31, 32 and 33 are similar, the operating waveforms of the inductors $L_1$, $L_2$ and $L_3$ of the plural converters 31, 32 and 33 are identical. Moreover, during operations of the power supply system 1, the phases between the operating waveforms of the inductors $L_1$, $L_2$ and $L_3$ are identical to each other or shifted relative to each other.

Figure 4:
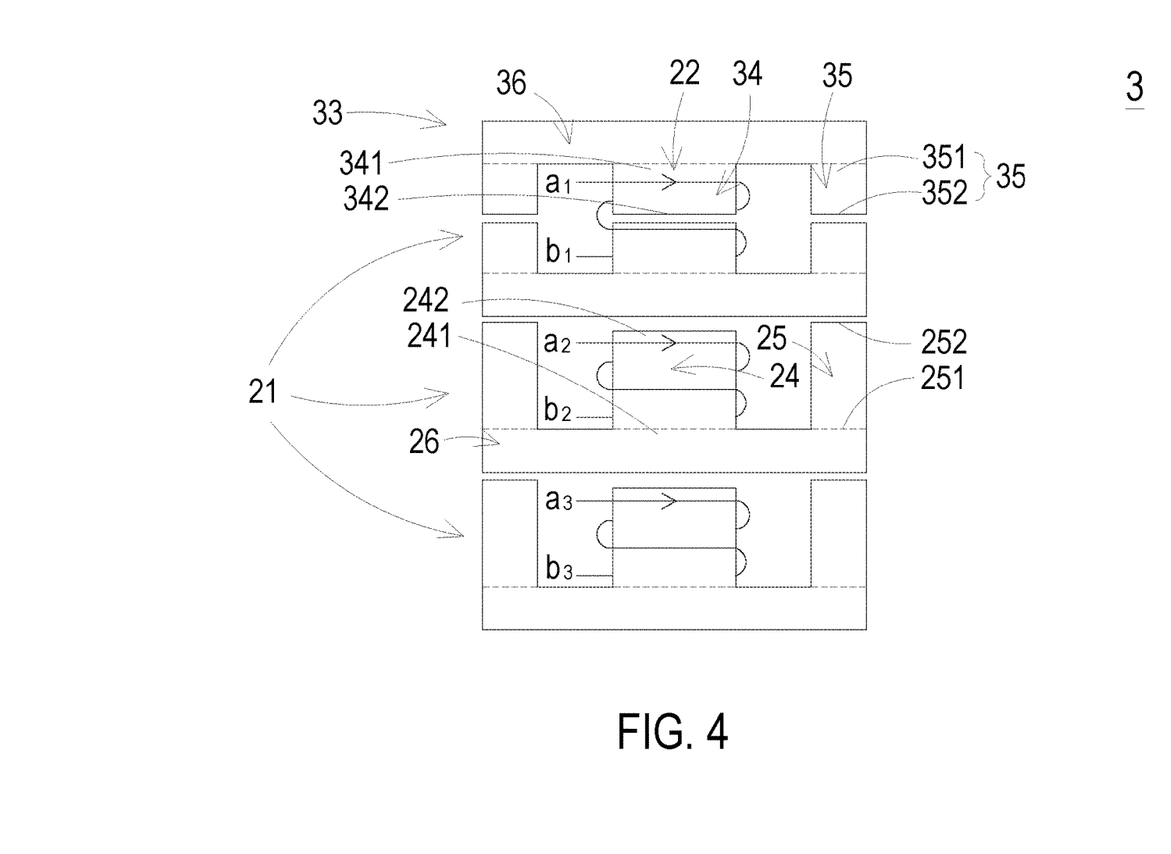
FIG. 4 schematically illustrates a variant example of the magnetic assembly of FIG. 2.

FIG. 4 schematically illustrates a variant example of the magnetic assembly of FIG. 2. The components of the magnetic assembly 3 and the relationships between these components are similar to those of the magnetic assembly 2 of the FIG. 2. Component parts and elements corresponding to those of the FIG. 2 are designated by identical numeral references, and detailed descriptions thereof are omitted. In comparison with the I-shaped core of the second magnetic core 23 of FIG. 2, the second magnetic core 33 of this embodiment is an E-shaped core with a second central leg 34, two second side legs 35 and a second connection part 36. The two second side legs 35 are opposed to each other with relative to the second central leg 34. Moreover, the distance between one second side leg 35 and the second central leg 34 is equal to the distance between the other second side leg 35 and the second central leg 34. The second connection part 36 is connected with the first terminal 341 of the second central leg 34 and the first terminals 351 of the two second side legs 35. The second magnetic core 33 is stacked over the plural first magnetic cores 21. Moreover, the second terminal 342 of the second central leg 34 and the second terminals 352 of the two second side legs 35 are respectively located adjacent to the second terminal 242 of the first central leg 24 and the second terminals 252 of the two first side legs 25 of the topmost first magnetic core 21. In one embodiment, when the second magnetic core 33 is stacked over the plural first magnetic cores 21, the first coil winding 22 wound around the first central leg 24 of the topmost first magnetic core 21 is also partially wound around the second central leg 34 of the second magnetic core 33.

Figure 5:
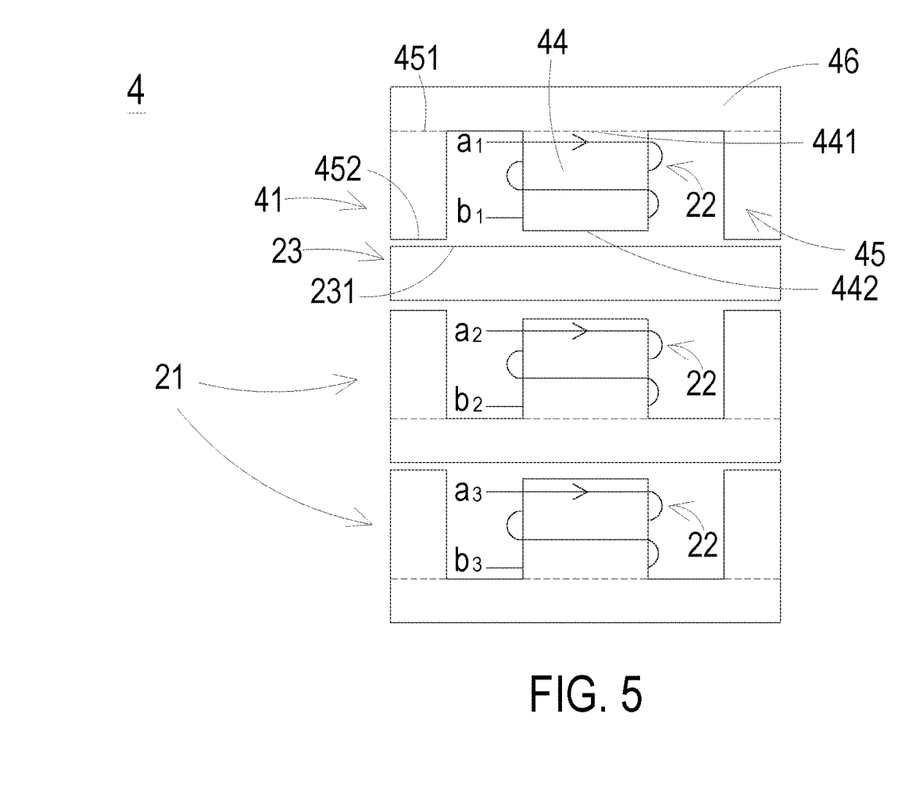
FIG. 5 schematically illustrates a further variant example of the magnetic assembly of FIG. 2.

FIG. 5 schematically illustrates a further variant example of the magnetic assembly of FIG. 2. The components of the magnetic assembly 3 and the relationships between these components are similar to those of the magnetic assembly 2 of the FIG. 2. Component parts and elements corresponding to those of the FIG. 2 are designated by identical numeral references, and detailed descriptions thereof are omitted. In this embodiment, the magnetic assembly 4 comprises two first magnetic cores 21, a second magnetic core 23 and a third magnetic core 41. In comparison with the magnetic assembly 2 of FIG. 2, the magnetic assembly 4 of this embodiment has less first magnetic core 21 but further comprises an additional third magnetic core 41. The third magnetic core 41 is located beside a second side 231 of the second magnetic core 23. The third magnetic core 41 is an E-shaped core with a third central leg 44, two third side legs 45 and a third connection part 46. Moreover, the third magnetic core 41 is symmetrical to the first magnetic core 21 with respect to the second magnetic core 23. The two third side legs 45 are opposed to each other with relative to the third central leg 44. Moreover, the distance between one third side leg 45 and the third central leg 44 is equal to the distance between the other third side leg 45 and the third central leg 44. The third connection part 46 is connected with the first terminal 441 of the third central leg 44 and the first terminals 451 of the two third side legs 45. Moreover, the second terminal 442 of the third central leg 44 and the second terminals 452 of the two third side legs 45 are located adjacent to a second side 231 of the second magnetic core 23. Moreover, a first coil winding 22 is wound around the third central leg 44 of the third magnetic core 41 so as to form the coil winding of the first inductor $L_1$ of the first converter 31 (see FIG. 1). Consequently, the first terminal $a_1$ and the second terminal $b_1$ of the first coil winding 22 correspond to the first terminal $a_1$ and the second terminal $b_1$ of the first inductor $L_1$ of FIG. 1, respectively.

Figure 6:
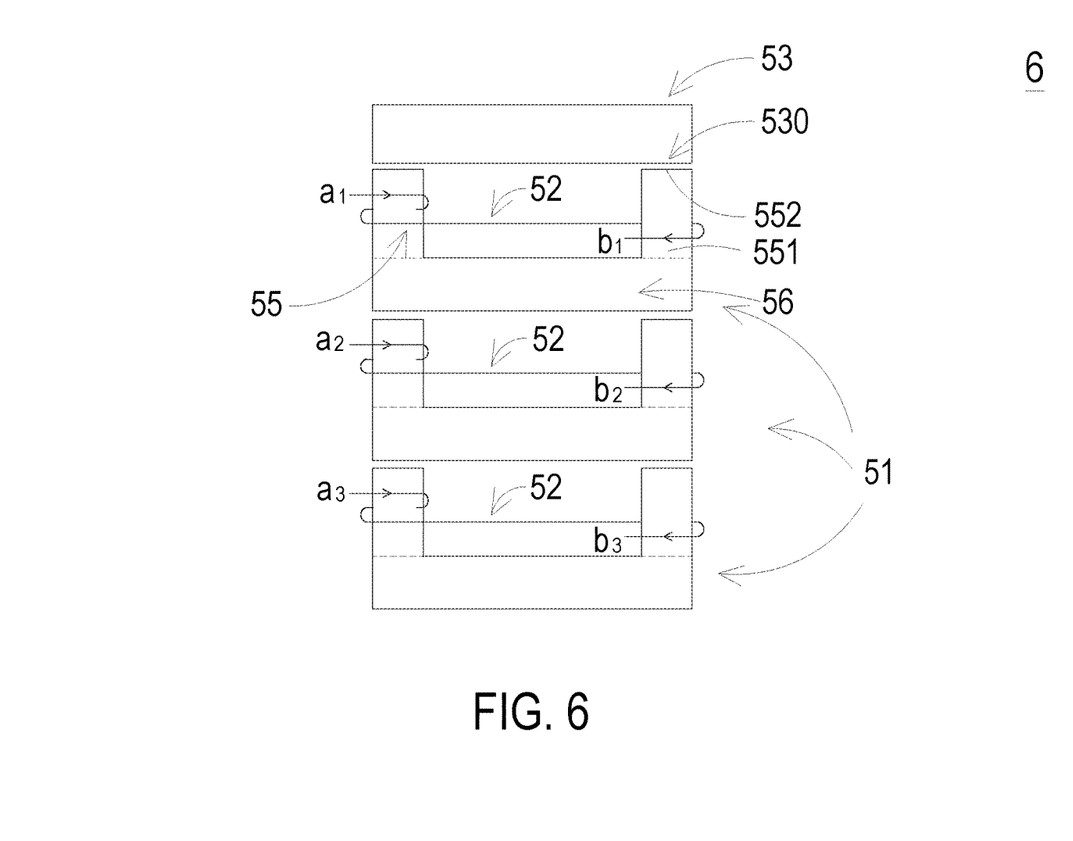
FIG. 6 schematically illustrates a still variant example of the magnetic assembly of FIG. 1.

FIG. 6 schematically illustrates a still variant example of the magnetic assembly of FIG. 1. In this embodiment, the magnetic assembly 6 comprises plural first magnetic cores 51, plural coil windings 52 and a second magnetic core 53. For example, the magnetic assembly 6 comprises three first magnetic cores 51, three coil windings 52 and a second magnetic core 53. Each first magnetic core 51 comprises plural legs 55 and a first connection part 56. The first terminals 551 of the plural legs 55 are connected with the first connection part 56.

Please refer to FIG. 6 again. The plural first magnetic cores 51 are stacked over each other from bottom to top. Consequently, the first connection part 56 of the upper first magnetic core 51 is located adjacent to the second terminals 552 of the plural legs 55 of the adjacent lower first magnetic core 51. Moreover, each coil winding 52 is wound around at least one leg 55 of the corresponding first magnetic core 51. Consequently, the plural first coil windings 52 are formed as the coil windings of the inductors $L_1$, $L_2$ and $L_3$ of the converters 31, 32 and 33, respectively. In this embodiment, the first terminals $a_1$, $a_2$ and $a_3$ of the three first coil windings 52 correspond to the first terminal $a_1$ of the first inductor $L_1$, the first terminal $a_2$ of the second inductor $L_2$ and the first terminal $a_3$ of the third inductor $L_3$, respectively. Moreover, the second terminals $b_1$, $b_2$ and $b_3$ of the three first coil windings 52 correspond to the second terminal $b_1$ of the first inductor $L_1$, the second terminal $b_2$ of the second inductor $L_2$ and the second terminal $b_3$ of the third inductor $L_3$, respectively. The second magnetic core 53 is stacked over the plural first magnetic cores 51. Consequently, a first side 530 of the second magnetic core 53 is located adjacent to the second terminals 552 of the legs 55 of the topmost first magnetic core 51.

In the embodiment of FIG. 6, the plural legs 55 of each first magnetic core 51 comprise two first side legs. Moreover, each first coil winding 52 is wound around the two first side legs of the corresponding first magnetic core 51. Moreover, the two first side legs and the first connection part 56 of each first magnetic core 51 are collaboratively formed as a U-shaped core.

Figure 7:
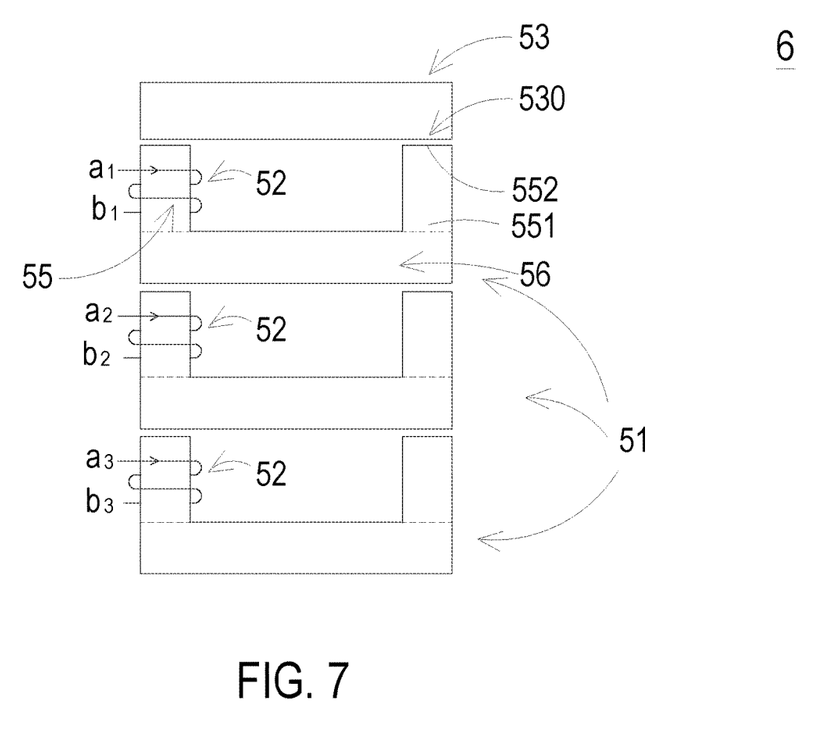
FIG. 7 schematically illustrates a variant example of the magnetic assembly of FIG. 6.

FIG. 7 schematically illustrates a variant example of the magnetic assembly of FIG. 6. In comparison with FIG. 6, each first coil winding 52 of the magnetic assembly 6 of this embodiment is wound around any first side leg of the corresponding first magnetic core 51.

The technical features of the U-shaped cores shown in FIGS. 6 and 7 are similar to those of the above E-shaped cores, and are not redundantly described herein.

Figure 8:
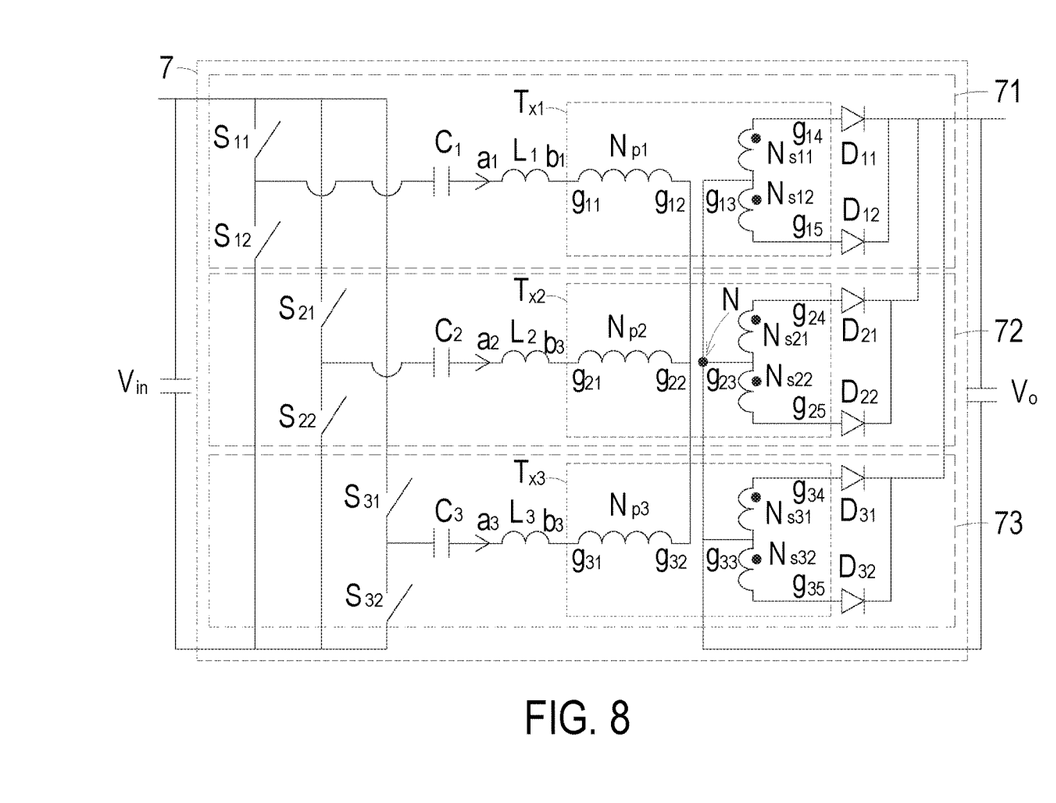
FIG. 8 is a schematic circuit diagram illustrating a power supply system according to a second embodiment of the present invention.
Figure 9:
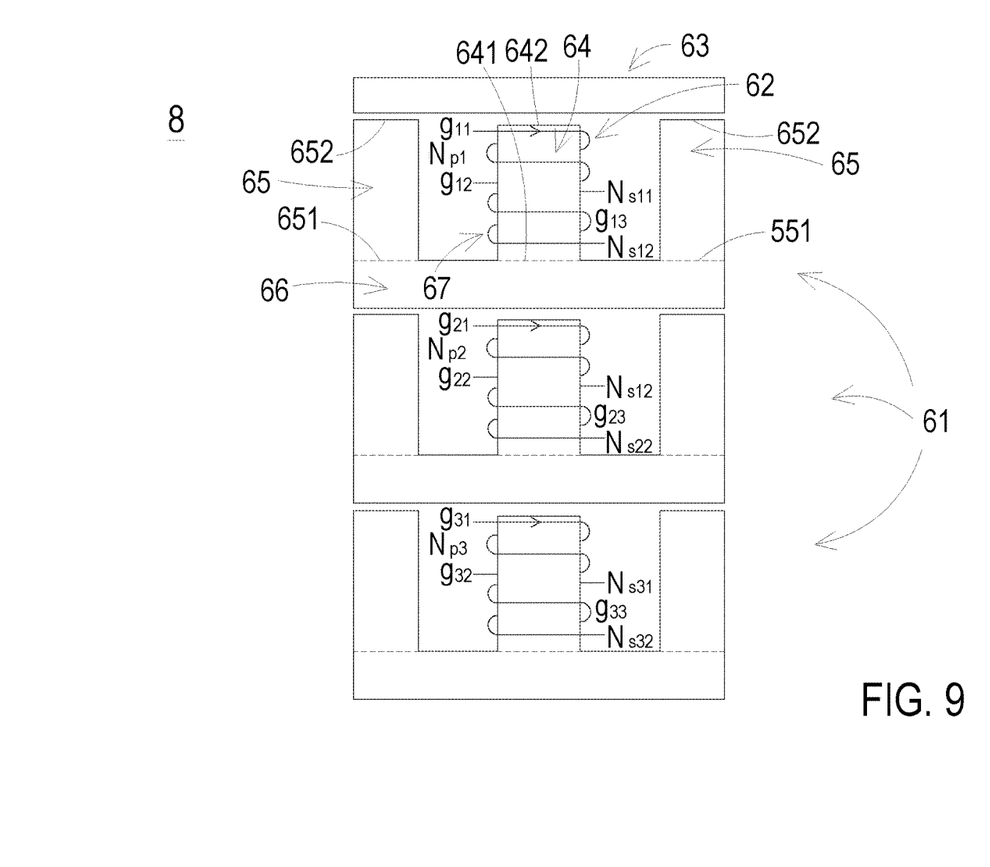
FIG. 9 schematically illustrates a magnetic assembly used in the power supply system of FIG. 8.

FIG. 8 is a schematic circuit diagram illustrating a power supply system according to a second embodiment of the present invention. FIG. 9 schematically illustrates a magnetic assembly used in the power supply system of FIG. 8. As shown in FIGS. 8 and 9, the power supply system 7 comprises plural converters, which are connected with each other in parallel. Preferably but not exclusively, plural converters comprises a first converter 71, a second converter 72 and a third converter 73. These converters 71, 72 and 73 receive an input voltage $V_{in}$ and converting the input voltage $V_{in}$ into an output voltage $V_o$. Preferably but not exclusively, the converters 71, 72 and 73 are LLC resonant converters.

In this embodiment, the first converter 71 comprises a first switch element $S_{11}$ a second switch element $S_{12}$, a capacitor $C_1$, a first magnetic element, a second magnetic element, a first diode $D_{11}$ and a second diode $D_{12}$. The circuitry configurations of the second converter 72 and the third converter 73 are similar to the circuitry configuration of the first converter 71. The second converter 72 comprises a first switch element $S_{21}$, a second switch element $S_{22}$, a capacitor $C_2$, a first magnetic element, a second magnetic element, a first diode $D_{21}$ and a second diode $D_{22}$. The second converter 73 comprises a first switch element $S_{31}$, a second switch element $S_{32}$, a capacitor $C_3$, a first magnetic element, a second magnetic element, a first diode $D_{31}$ and a second diode $D_{32}$. The first magnetic elements are the inductors $L_1$, $L_2$ and $L_3$. The second magnetic elements are transformers $T_{x1}$, $T_{x2}$ and $T_{x3}$. The transformer $T_{x1}$ comprises a primary coil winding $N_{p1}$ and plural secondary coil windings $N_{s11}$ and $N_{s12}$. The transformer $T_{x2}$ comprises a primary coil winding $N_{p2}$ and plural secondary coil windings $N_{s21}$ and $N_{s22}$. The transformer $T_{x3}$ comprises a primary coil winding $N_{p3}$ and plural secondary coil windings $N_{s31}$ and $N_{s32}$. The primary coil winding $N_{p1}$ has a first terminal $g_{11}$ and a second terminal $g_{12}$. The primary coil winding $N_{p2}$ has a first terminal $g_{21}$ and a second terminal $g_{22}$. The primary coil winding $N_{p3}$ has a first terminal $g_{31}$ and a second terminal $g_{32}$. The shared third terminal $g_{13}$ of the secondary coil windings $N_{s11}$ and $N_{s12}$, the shared third terminal $g_{23}$ of the secondary coil windings $N_{s21}$ and $N_{s22}$ and the shared third terminal $g_{33}$ of the secondary coil windings $N_{s31}$ and $N_{s32}$ are used as center taps. The first terminals of the first switch elements $S_{11}$, $S_{21}$ and $S_{31}$ are electrically connected with an input terminal of the power supply system 7. The second terminals of the first switch elements $S_{11}$, $S_{21}$ and $S_{31}$ are electrically connected with the first terminals of the $S_{12}$, $S_{22}$ and $S_{32}$, respectively. The first terminals of the capacitors $C_1$, $C_2$ and $C_3$ are electrically connected with the second terminals of the first switch elements $S_{11}$, $S_{21}$ and $S_{31}$ and the first terminals of the $S_{12}$, $S_{22}$ and $S_{32}$, respectively. The second terminals of the capacitors $C_1$, $C_2$ and $C_3$ are electrically connected with the first terminals $a_1$, $a_2$ and $a_3$ of the inductors $L_1$, $L_2$ and $L_3$, respectively. The second terminals $b_1$, $b_2$ and $b_3$ of the inductors $L_1$, $L_2$ and $L_3$ are electrically connected with the first terminals $g_{11}$, $g_{21}$ and $g_{31}$ of the primary coil windings of the transformers $T_{x1}$, $T_{x2}$ and $T_{x3}$, respectively. The second terminals $g_{12}$, $g_{22}$ and $g_{32}$ of the primary coil windings of the transformers $T_{x1}$, $T_{x2}$ and $T_{x3}$ are electrically connected with each other. The third terminals $g_{13}$, $g_{23}$ and $g_{33}$ of the secondary coil windings of the transformers $T_{x1}$, $T_{x2}$ and $T_{x3}$ are electrically connected with a common node N. The fourth terminals $g_{14}$, $g_{24}$ and $g_{34}$ of the secondary coil windings $N_{s11}$, $N_{s21}$ and $N_{s31}$ of the transformers $T_{x1}$, $T_{x2}$ and $T_{x3}$ are electrically connected with the first diodes $D_{11}$, $D_{21}$ and $D_{31}$, respectively. The fifth terminals $g_{15}$, $g_{25}$ and $g_{35}$ of the secondary coil windings $N_{s12}$, $N_{s22}$ and $N_{s32}$ of the transformers $T_{x1}$, $T_{x2}$ and $T_{x3}$ are electrically connected with the second diodes $D_{12}$, $D_{22}$ and $D_{32}$, respectively. Moreover, the inductors $L_1$, $L_2$ and $L_3$ of FIG. 2 may be implemented with the magnetic assembly 2 of FIG. 2.

Please refer to FIG. 9 and FIG. 8. In this embodiment, the transformers $T_{x1}$, $T_{x2}$ and $T_{x3}$ are implemented with the magnetic assembly 8. The magnetic assembly 8 comprises plural first magnetic cores 61, plural coil windings 62, plural second coil windings 67 and a second magnetic core 63. Each first magnetic core 61 comprises a first central leg 64, plural first side legs 65 and a first connection part 66. The components of the magnetic assembly 8 and the relationships between these components are similar to those of the magnetic assembly 2 of the FIG. 2. Component parts and elements corresponding to those of the FIG. 2 are designated by identical numeral references, and detailed descriptions thereof are omitted. In comparison with the magnetic assembly 2 of FIG. 2, a second coil winding 67 is further wound around the first central leg 64 of each first magnetic core 61 of the magnetic assembly 8 of this embodiment. In other words, the first coil winding 62 wound around each first magnetic core 61 is a primary coil winding, and the second coil winding 67 wound around each first magnetic core 61 is used as secondary coil windings. Moreover, the secondary coil windings have a center tap. Consequently, the first terminals $g_{11}$, $g_{21}$ and $g_{31}$ of the three first coil windings 62 correspond to the first terminal $g_{11}$ of the transformer $T_{x1}$, the first terminal $g_{21}$ of the transformer $T_{x2}$ and the first terminal $g_{31}$ of the transformer $T_{x3}$, respectively. In addition, the second terminals $g_{12}$, $g_{22}$ and $g_{32}$ of the three first coil windings 62 correspond to the first terminal $g_{12}$ of the transformer $T_{x1}$, the first terminal $g_{22}$ of the transformer $T_{x2}$ and the first terminal $g_{32}$ of the transformer $T_{x3}$, respectively. The third terminals $g_{13}$, $g_{23}$ and $g_{33}$ of the three second coil windings 67 correspond to the third terminals $g_{13}$, $g_{23}$ and $g_{33}$ of the transformers $T_{x1}$, $T_{x2}$ and $T_{x3}$. In some embodiment, each of the first coil winding 62 and the second coil winding 67 is composed of plural coil windings. Moreover, the first coil winding 62 and the second coil winding 67 are formed as the primary coil winding and the secondary coil winding, respectively.

In one embodiment, adjusts the magnetizing inductance values of the primary coil winding $N_{p1}$, $N_{p2}$ and $N_{p3}$ of the transformers $T_{x1}$, $T_{x2}$ and $T_{x3}$ to be equal, to make the electric currents flowing through the first coil winding 62 wounding round the first central legs 64 of the three first magnetic cores 61 of the converters 71, 72 and 73 to be equal. In one embodiment, adjusts the turns of the first coil windings 62 to be equal, to make the magnetizing inductance values of the primary coil winding $N_{p1}$, $N_{p2}$ and $N_{p3}$ of the transformers $T_{x1}$, $T_{x2}$ and $T_{x3}$ to be equal.

The technical features of the other components of the magnetic assembly 8 as shown in FIG. 9 are similar to those of the magnetic assembly 2 of FIG. 2, and are not redundantly described herein.

From the above descriptions, the present invention provides a magnetic assembly and a power supply system with the magnetic assembly. The magnetic assembly comprises plural magnetic elements of plural converters. Moreover, portions of the first connection parts of the first magnetic cores are shared by adjacent first magnetic cores. Consequently, the magnetic assembly with the plural magnetic elements has reduced volume and weight, and the fabricating cost is reduced. Moreover, since the inductance values of the magnetic elements are equal or the magnetizing inductance values of the transformers are equal, the plural parallel-connected converters can be controlled more easily.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic assembly for plural parallel-connected converters, the magnetic assembly comprising:
    plural first magnetic cores stacked over each other from bottom to top, wherein each of the plural first magnetic cores comprises plural legs and a first connection part, and the first connection part is connected with first terminals of the plural legs, wherein the first connection part of the first magnetic core at an upper position is located adjacent to second terminals of the plural legs of the adjacent first magnetic core at a lower position;
    plural coil windings, wherein each coil winding is wound around at least one leg of the plural legs of the corresponding first magnetic core so as to form a magnetic element of the corresponding converter; and
    a second magnetic core stacked over the plural first magnetic cores, wherein the second magnetic core is located adjacent to the second terminals of the legs of the topmost first magnetic core;
    wherein electric currents which flow through the plural first coil windings are in the same direction, and the magnetic fluxes through the first connection part of the upper first magnetic core which correspond to the two first coil windings of the two adjacent first magnetic cores are in opposite directions.

2. The magnetic assembly according to claim 1, wherein the plural legs of each first magnetic core comprise a first central leg and two first side legs, wherein the two first side legs are opposed to each other with respect to the first central leg, and the first connection part is connected with the first terminals of the first central leg and the two first side legs, wherein the first connection part of the first magnetic core at the upper position is located adjacent to the second terminals of the first central leg and the two first sides legs of the adjacent first magnetic core at the lower position.

3. The magnetic assembly according to claim 2, wherein each coil winding is wound around the first central leg of the corresponding first magnetic core.

4. The magnetic assembly according to claim 2, wherein the second magnetic core comprise a second central leg, two second side legs and a second connection part, wherein the two second side legs are opposed to each other with respect to the second central leg, and the second connection part is connected with first terminals of the second central leg and the two second side legs, wherein second terminals of the second central leg and the two second side legs of the second magnetic cores are respectively located adjacent to the second terminals of the first central leg and the two first sides legs of the topmost first magnetic core.

5. The magnetic assembly according to claim 4, wherein the first coil winding wound around the first central leg of the topmost first magnetic core is also partially wound around the second central leg of the second magnetic core.

6. The magnetic assembly according to claim 2, wherein second magnetic core is an I-shaped core, wherein a first side of the I-shaped core is located adjacent to the second terminals of the first central leg and the two first sides legs of the topmost first magnetic core.

7. The magnetic assembly according to claim 6, further comprising a third magnetic core, wherein the third magnetic core comprise a third central leg, two third side legs and a third connection part, wherein the two third side legs are opposed to each other with respect to the third central leg, and the third connection part is connected with first terminals of the third central leg and the two third side legs, wherein second terminals of the third central leg and the two third side legs of the third magnetic cores are located adjacent to a second side of the I-shaped core.

8. The magnetic assembly according to claim 1, wherein the plural legs of each first magnetic core comprise two first side legs, and the first connection part is connected with the first terminals of the two first side legs, wherein the first connection part of the first magnetic core at the upper position is located adjacent to the second terminals of the two first sides legs of the adjacent first magnetic core at the lower position.

9. The magnetic assembly according to claim 8, wherein each coil winding is wound around at least one of the two first side legs of the corresponding first magnetic core.

10. The magnetic assembly according to claim 2, wherein the two first side legs of each first magnetic core have the same length.

11. The magnetic assembly according to claim 1, wherein the magnetic element is an inductor, and the inductors of the plural converter have the same inductance value.

12. The magnetic assembly according to claim 1, wherein a second coil winding is further wound around the at least one leg of the corresponding first magnetic core.

13. The magnetic assembly according to claim 12, wherein the magnetic element is a transformer, wherein the first coil winding of the transformer is a primary coil winding, and the second coil winding of the transformer is a secondary coil winding.

14. The magnetic assembly according to claim 13, wherein the transformers of the plural converter have the same magnetizing inductance value.

* * * * *